Feb. 11, 1964 J. SCHAEFER 3,121,174
CIRCUIT FOR OVERCURRENT DETECTION
Filed Aug. 30, 1960 2 Sheets-Sheet 2
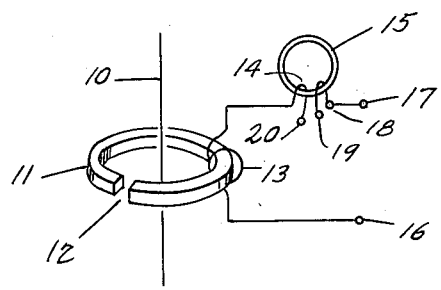
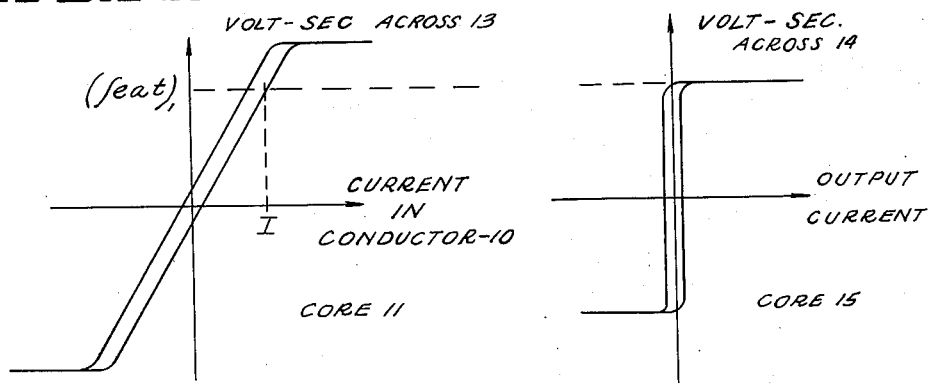
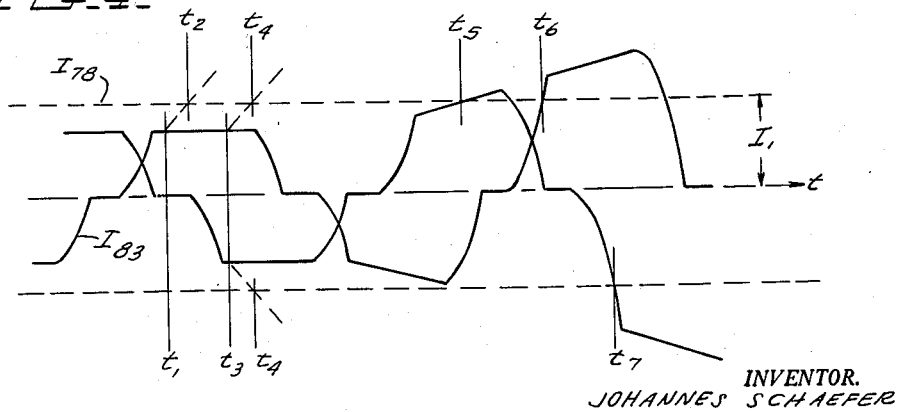
INVENTOR.
JOHANNES SCHAEFER
BY
OSTROLENK, FABER, GERB & SOFFEN
ATTORNEYS United States Patent Office 3,121,174
Patented Feb. 11, 1964

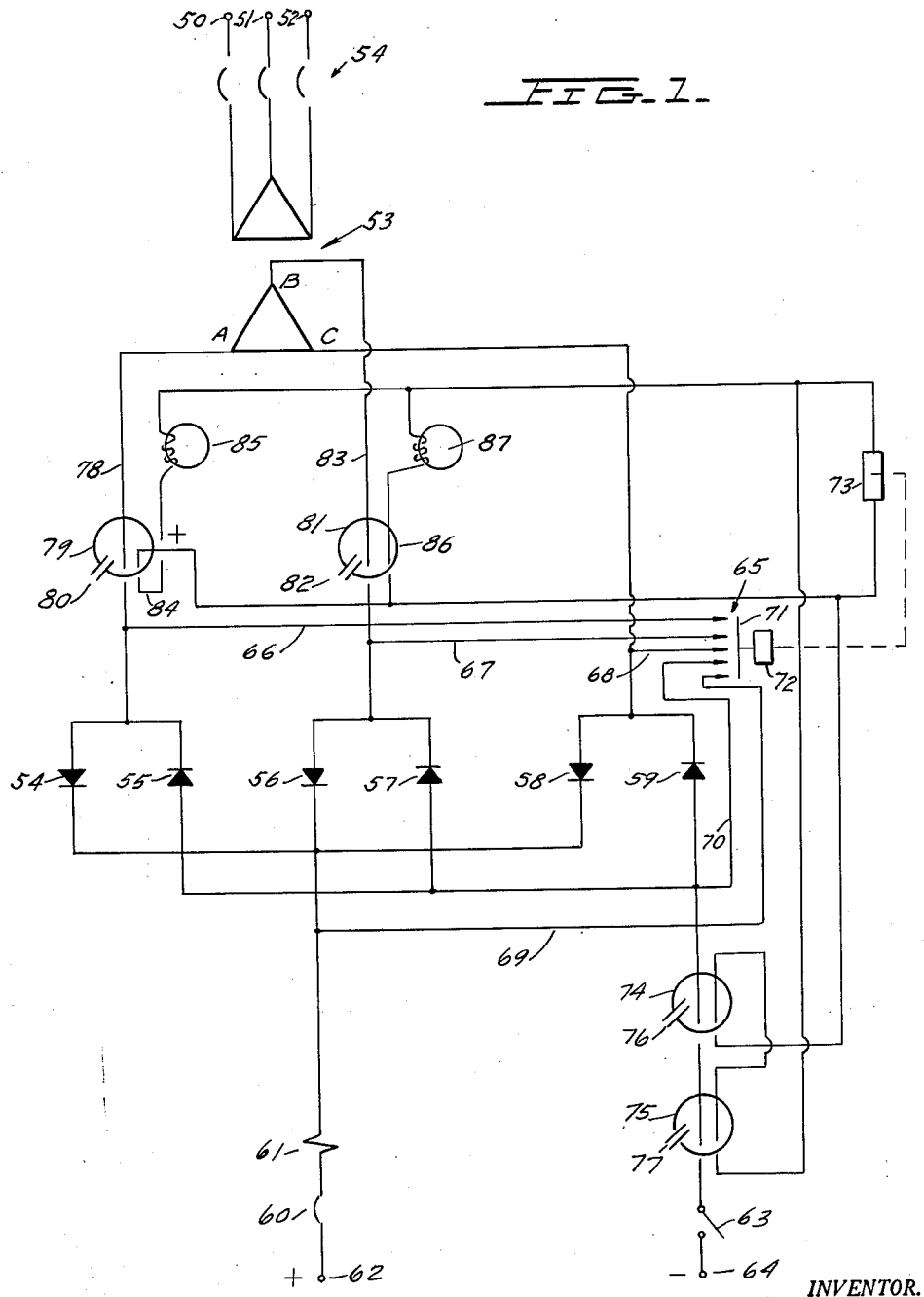

3,121,174
CIRCUIT FOR OVERCURRENT DETECTION
Johannes Schaefer, Philadelphia, Pa., assignor to I-T-E Circuit Breaker Company, Philadelphia, Pa., a corporation of Pennsylvania
Filed Aug. 30, 1960, Ser. No. 52,885
8 Claims. (Cl. 307—88)

This invention relates to a current sensing device and more specifically relates to a magnetic structure for generating a signal responsive to predetermined conditions such as an overload or short circuit current.

Current sensing devices are widely used throughout the electrical industry and typically are used in applications where electrical equipment is to be somehow protected by protective means during electrical fault conditions. By way of example, a circuit breaker must be operated responsive to overload or short circuit conditions. Thus, some type of sensing means is required to initiate their operation. In a like manner, the rectifier element of a rectifier circuit should be immediately protected responsive to fault conditions in its circuit as by causing a short circuiter to become operative to short circuit the rectifier element during fault conditions.

In the latter capacity where the circuit elements are semiconductor rectifiers, extremely high speed operation is necessary because of the low overload capacity of the elements.

Many systems have been proposed for quickly initiating the operation of such devices. By way of example, in copending U.S. application, Serial Number 641,301, in the name of Edward John Diebold, filed February 20, 1957, entitled "Instantaneous Trip for Rectifier Protection," now U.S. Patent No. 2,971,146, and assigned to the assignee of the present invention, a short circuiter receives a tripping impulse directly from a saturable core connected in a D.-C. portion of the rectifier circuit. A bias may be provided for this device to keep it saturated so long as there is normal current flow in the circuit to which it responds. When, however, there is an increase in the current through the main winding beyond some predetermined value, the bias is overcome so that there will be a flux change which delivers a signal for operating a short circuiter. However, a saturable current transformer which operates in this manner requires a substantial number of biasing ampere turns and requires a special stabilized power supply for the bias current.

The present invention provides a novel magnetic signaling system which will generate an output signal responsive to an excessive absolute current through the circuit driving the system and does not require auxiliary control equipment.

In accordance with the present invention, a portion of the circuit to be protected acts as a primary winding for a magnetic core, and an output winding is placed on the core to form a transformer. The output winding of the transformer is connected in series with a saturable type reactor and the output which is to be driven by the sensing circuit. The voltage time integral of the transformer is made larger than the voltage time integral of the saturable type reactor. Thus, the saturable type reactor will saturate prior to the time that the magnetic core of the transformer will saturate.

The saturable type reactor is further formed to have a relatively low magnetizing current and preferably is formed of material which has a relatively square hysteresis loop. The magnetic core of the transformer, however, has a relatively linear and slanted magnetizing curve as a result of an air gap in the core.

From the foregoing, the point at which the saturable type reactor saturates will correspond to a predetermined current value flowing in the primary winding of the transformer. Thus, by setting a normal current value to be below that value at which the saturable type reactor saturates, the output current of the output circuit will be limited to the relatively low magnetizing current of the saturable type reactor and substantially all of the voltage generated in the output winding of the transformer will fall across the saturable type reactor. Thus, there will be substantially no output signal under normal current conditions.

When, however, the current through the primary winding of the transformer core exceeds a value which corresponds to saturation of the saturable reactor, the continuing voltage generated in the output winding will be directly impressed across the output circuit sensing means and the output current will be limited only by the impedance of the output circuit. It will be noted that this circuit is limited to operation in A.-C. circuits.

In order to adjust the point at which the predetermined current is reached to generate an output signal, it is only necessary to adjust the air gap which adjusts the slope of the output characteristic of the transformer.

It is furthermore noted that the device can also be adjusted by changing the $\int edt$ value that the saturable reactor can absorb by changing the number of turns of the winding. This, of course, can be done by means of a tap changer if desired.

Accordingly, a primary object of this invention is to provide a novel signal generating circuit.

A further object of this invention is to provide a novel signal generating circuit having a magnetic core that encompasses a portion of the circuit to be protected and delivers an output signal through a saturable type reactor, which blocks the signal until the reactor is saturated.

Another object of this invention is to provide a novel magnetic circuit which includes a transformer driven by the circuit to be protected which saturates at a higher number of volt seconds than does a saturable type reactor connected in the output circuit of the transformer.

These and other objects of the invention will become apparent when taken in conjunction with the description of the following drawings in which:

FIGURE 1 shows a preferred embodiment of the invention when used in a three phase full wave rectifier system for operating a short circuiter means which protects the rectifier element under fault conditions.

FIGURE 2 shows the magnetic elements forming the present invention.

FIGURES 3a and 3b show the characteristic curves of the magnetic core and saturable type reactor respectively of FIGURE 2.

FIGURE 4 shows a plot of rectifier current as a function of time for the circuit of FIGURE 1 in illustrating the operation of the present invention.

Referring first to FIGURES 2 and 3, it is assumed that a signal is desired when the current in conductor 10 exceeds some predetermined value such as the value $I_1$ of FIGURE 3a which shows the current in conductor 10 on the horizontal axis.

In accordance with the present invention, conductor 10 is encircled by a magnetic core 11 having an air gap 12 therein. A secondary winding 13 is then placed on core 11 to form a transformer. The secondary winding or output winding 13 is then connected in series with winding 14 of reactor core 15, which is characterized in having a square hysteresis loop and a relatively low magnetizing current.

The output terminals 16 and 17 then have some type of utilization circuit connectable thereto to cause operation of associated equipment, such as circuit interrupting means or short circuiting means when the current in conductor 10 exceeds a preset value.

The characteristic curve of the saturable reactor comprised of winding 14 and core 15 is shown in FIGURE 3b while the characteristic curve of core 11 is shown in FIGURE 3a.

In accordance with the invention, reactor core 15 saturates when the output volt seconds of winding 13 reaches the value ($\int edt$). This value is reached as seen in characteristic curve of FIGURE 3a for core 11 at a current value $I_1$, through primary winding 10. The volt second rating of core 11, however, exceeds that of the saturable type reactor, whereby core 11 continues to execute a flux change after the current value $I_1$.

If the primary current in conductor 10 increases from zero to $I_1$, then core 11 will deliver ($\int edt$), volt-seconds (remanence neglected) as seen in FIGURE 3a. This amount of volt-seconds brings core 15 to saturation if core 15 also started from zero and if the amount is delivered within a short period of time. Both of these conditions are satisfied with A.-C. With D.-C. the starting conditions (starting from zero) is uncertain, since it depends upon prior conditions. Also, if the D.-C. current increases slowly, the voltage may not be sufficient to drive the excitation current for core 15 and thus the volt-seconds may be wasted.

The characteristic curve of the saturable reactor comprised of winding 14 and core 15 is shown in FIGURE 3b while the characteristic curve of core 11 is shown in FIGURE 3a.

Thus, in operation and so long as the current through conductor 10 is below the value $I_1$, the flux change of the saturable type reactor 15 will be insufficient to cause its saturation, so that the output current at terminals 16 and 17 is limited to the relatively low magnetizing current of winding 14. When, however, the input current through conductor 10 exceeds the value $I_1$, reactor core 15 saturates and the voltage which continues to exist on winding 13 of core 11, which is still unsaturated, appears directly across terminals 16 and 17 to drive any desired utilization circuit which is to be energized when the current exceeds the predetermined value $I_1$.

It is to be noted that the current value $I_1$ is controlled by the adjustment of the slope of the curve in FIGURE 3a which, in turn, is controlled by the air gap 12. Thus, by adjusting air gap 12, the value $I_1$ may similarly be controlled. In like manner the current value $I_1$ can be adjusted by changing the $\int edt$ value of the saturable reactor 15. This can be achieved by changing the number of turns in winding 14 so that terminal 17 is connected to tap 19 or 20 instead of tap 18.

The manner in which the invention may be applied to a three phase rectifier circuit to initiate operation of a short circuiting means responsive to fault conditions is shown in FIGURE 1.

Referring to FIGURE 1, the rectifier system is connected to a source of three phase power at terminals 50, 51 and 52 and is connected to a power transformer 53 through the A.-C. circuit breaker 54. The secondary winding of transformer 53 is connected to rectifier elements 54 through 59 in the standard manner. Rectifier elements 54 through 59 may be of any desired type, such as germanium or silicon cells and each of the cell positions could be comprised of any desired number of parallel connected and series connected elements to satisfy the voltage and current requirements of the circuit. Cells 54, 56 and 58 are then connected together by a common bus and are connected in series with a D.-C. circuit breaker 60 having trip means 61 and positive output D.-C. terminal 62. Cells 55, 57 and 59 are similarly connected to a common bus and are taken out through disconnect switch 63 to a negative D.-C. terminal 64.

In the event of a fault condition somewhere within the system of FIGURE 1 or due to the failure of some of the cells associated therewith, it is extremely important to protect the remaining cells as rapidly as possible because of their low overload capacity. To this end, a short circuiter means 65 is provided to electrically connect each of the A.-C. phases and each of the D.-C. buses to one another. The short circuiter can, for example, be of the type set forth in above noted U.S. copending application, Serial No. 641,301, or could be of the type shown in U.S. Patent 2,888,538, entitled "Explosive Type Short Circuiter," filed May 26, 1960, to Jensen and assigned to the assignee of the present invention.

Thus, as is schematically illustrated in FIGURE 1, conductors 66, 67 and 68 are connected to the three phases respectively and conductors 69 and 70 are connected to the two output D.-C. buses. Each of conductors 66 through 70 is then terminated by contact means adjacent a common contact means 71. This common contact means 71 of short circuiter 65 is under the control of an operating means 72 which is operable to cause contact means 71 to electrically interconnect the terminals of conductors 66 through 70 to cause short circuiting of all of the cells 54 through 59 under predetermined fault conditions.

The operating means 72 is energized from energizable means 73 which is connected at the output of the fault sensing means of the invention. Thus, where an appropriate output is received by energizable means 73, operating means 72 will cause contact means 71 to interconnect the A.-C. and D.-C. buses, whereby cells 54 through 59 will be short circuited responsive to fault conditions until the relatively slower protective devices 54 and 60 are operated to remove the circuit from the line.

It will be noted that the negative D.-C. bus is illustrated as having the outputs of current transformers 74 and 75 which have air gaps 76 and 77, respectively, in opposed relation and in series with sensing means 73. As is fully described in my copending U.S. application, Serial No. 52,810, filed August 30, 1960, entitled "Fault Current Sensing Means," and assigned to the assignee of the present invention, the cores 74 and 75 have different volt-second ratings so that when the current exceeds some predetermined value in the D.-C. bus, a signal will be delivered to sensing means 73 to cause operation of short circuiter 65. For details of the operation of this circuit, reference is made to the above noted copending application.

Thus, it is noted that cores 74 and 75 is an additional rate-of-rise trip and does not form part of the instant invention. The two cores 79 and 81 with their saturable reactors 85 and 87, form a complete overload protective device. However, cores 79 and 81 can be combined with cores 74 and 75 as illustrated in FIGURE 1.

The manner in which the present invention is applicable to the circuit of FIGURE 1 is schematically illustrated for the first two phases A and B of the rectifier. Thus, the A.-C. conductor 78 of phase A has a core 79 which includes an air gap 80 placed thereon, while a similar core 81 having an air gap 82 is placed on conductor 83 of phase B. The output winding 84 of core 79 is connected in series with saturable type reactor 85 and, in a similar manner, an output winding 86 of core 81 is connected in series with saturable type reactor 87.

It will be recognized that the system, including core 79 and core 85 for phase A and the system including core 81 and reactor 87 for phase B, are substantially identical to the system of FIGURE 2. The systems for phases A and B of FIGURE 1 are then connected in parallel with one another with opposite polarity of 84 and 86 and with sensing means 73. Accordingly, whenever a fault current appears in either of the phase conductors for phases A, B or C, an output signal will be rapidly delivered to sensing means 73 to cause operation of short circuiter 65.

This operation is best understood by reference to FIGURE 4 which shows the current $I_{78}$ flowing through conductor 78 and $I_{83}$ flowing through conductor 83, both being plotted on a common time scale. Assuming that at time $t$, there is a sudden increase in load current, it is seen by the dotted lines that this current will exceed the value $I_1$ at time $t_2$. Thus, at time $t_2$ a signal will begin to be delivered to sensing means 73 to operate short circuiter 65 since at this time the saturable reactor 87 is saturated.

In the event that the fault occurs at time $t_3$ as shown in FIGURE 4 in dotted lines, both of windings 84 and 86 will deliver a signal to sensing means 73. Since the outputs of the two circuits are in parallel and in opposite polarity, the signals will be added together instead of compensated so that a sharp output signal will be delivered to sensing means 73.

In the event that the fault current has a low rate of rise as illustrated in the right-hand portion of FIGURE 4, at time $t_5$, the phase current through conductor 78 just slightly exceeds the value of $I_1$ and raises slowly so that a low voltage signal is delivered to sensing means 73 which may be insufficient to cause tripping of short circuiter 65. If, however, the fault continues, it is seen that in the next third of the cycle and at time $t_6$, the current in conductor 83 rises very rapidly through the value $I_1$, during the commutation portion of the cycle, so that a very high voltage signal will be delivered to sensing means 73.

Although I have described preferred embodiments of my novel invention, many variations and modifications will now be obvious to those skilled in the art, and I prefer therefore to be limited not by the specific disclosure herein but only by the appended claims.

I claim:

1. A fault sensing circuit for energizing an output circuit responsive to predetermined current conditons; said fault sensing circuit comprising a magnetic core having an output winding for connection to an A.C. current source and a saturable type reactor; said magnetic core having an air gap therein and being magnetically coupled to an electrical current to be monitored; said output winding being connected in series with said saturable type reactor and said output circuit; said saturable type reactor being magnetically saturated at a first volt second value applied thereto; said magnetic core saturating at a second volt second value higher than said first value; said magnetic saturation of said saturable type reactor corresponding to a predetermined value of said electrical current being monitored.

2. A fault sensing circuit for energizing an output circuit responsive to predetermined current conditions; said fault sensing circuit comprising a magnetic core having an output wnding for connection to an A.-C. current source and a saturable type reactor; said magnetic core having an air gap therein and being magnetically coupled to an electrical current to be monitored; said output winding being connected in series with said saturable type reactor and said output circuit; said saturable type reactor being magnetically saturated at a first volt second value applied thereto; said magnetic core saturating at a second volt second value higher than said first value; said magnetic saturation of said saturable type reactor corresponding to a predetermined value of said electrical current being monitored; said predetermined value of current being adjustable by adjustment of said air gap.

3. A sensing circuit for delivering an output signal responsive to predetermined electrical current conditions; said sensing circuit comprising a first magnetic core having a sloping hysteresis loop and a second magnetic core having a relatively rectangular hysteresis loop; said first magnetic core having an input winding connected to carry an A.-C. current to be monitored and an output winding; said second magnetic core having a reactor winding thereon; said second magnetic core and said reactor winding thereon having a first volt second rating; said first magnetic core and its said input winding having a second volt second rating; said output winding being connected in series with said reactor winding and an output means.

4. A sensing circuit for delivering an output signal responsive to predetermined electrical current conditions; said sensing circuit comprising a first magnetic core having a sloping hysteresis loop and a second magnetic core having a relatively rectangular hysteresis loop; said first magnetic core having an input winding connected to carry an A.-C. current to be monitored and an output winding; said second magnetic core having a reactor winding thereon; said second magnetic core and said reactor winding thereon having a first volt second rating; said first magnetic core and its said input winding having a second volt second rating; said output winding being connected in series with said reactor winding and an output means; said reactor winding absorbing the output voltage on said output winding until said second magnetic core saturates.

5. A sensing circuit for delivering an output signal responsive to predetermined electrical current conditions; said sensing circuit comprising a first magnetic core having a sloping hysterisis loop and a second magnetic core having a relatively rectangular hysteresis loop; said first magnetic core having an input winding connected to carry an A.-C. current to be monitored and an output winding; said second magnetic core having a reactor winding thereon; said second magnetic core and said reactor winding thereon having a first volt second rating; said first magnetic core and its said input winding having a second volt second rating; said output winding being connected in series with said reactor winding and an output means; said reactor winding absorbing the output voltage on said output winding until said second magnetic core saturates; the slope of said hysteresis loop of said first magnetic core determining the value of current through said input winding at which said second magnetic core saturates.

6. A sensing circuit for delivering an output signal responsive to predetermined electrical current conditions; said sensing circuit comprising a first magnetic core having a sloping hysteresis loop and a second magnetic core having a relatively rectangular hysteresis loop; said first magnetic core having an input winding connected to carry an A.-C. current to be monitored and an output winding; said second magnetic core having a reactor winding thereon; said second magnetic core and said reactor winding thereon having a first volt second rating; said first magnetic core and its said input winding having a second volt second rating; said output winding being connected in series with said reactor winding and an output means; said first magnetic core having an air gap therein to control the slope of its said hysteresis loop.

7. A sensing circuit for delivering an output signal responsive to predetermined electrical current conditions; said sensing circuit comprising a first magnetic core having a sloping hysteresis loop and a second magnetic core having a relatively rectangular hysteresis loop; said first magnetic core having an input winding connected to carry an A.-C. current to be monitored and an output winding; said second magnetic core having a reactor winding thereon; said second magnetic core and said reactor winding thereon having a first volt second rating; said first magnetic core and its said input winding having a second volt second rating; said output winding being connected in series with said reactor winding and an output means; said first magnetic core having an air gap therein to control the slope of its said hysteresis loop; said reactor winding absorbing the output voltage on said output winding until said second magnetic core saturates; the slope of said hysteresis loop of said first magnetic core determining the value of current through said input winding at which said second magnetic core saturates.

8. A sensing circuit for delivering an output signal responsive to predetermined electrical current conditions; said sensing circuit comprising a first magnetic core having a sloping hysteresis loop and a second magnetic core having a relatively rectangular hysteresis loop; said first magnetic core having an input winding connected to carry an A.-C. current to be monitored and an output winding; said second magnetic core having a reactor winding thereon; said second magnetic core and said reactor winding thereon having a first volt second rating; said first magnetic core and its said input winding having a second volt second rating; said output winding being connected in series with said reactor winding and an output means; said second magnetic core having a number of taps on said reactor winding to permit control of the point value of current through said input winding at which said second magnetic core saturates.

References Cited in the file of this patent

UNITED STATES PATENTS

| | | |
|---|---|---|
| 2,649,568 | Felch | Aug. 18, 1953 |
| 2,751,509 | Torrey | June 19, 1956 |
| 2,811,710 | Demer | Oct. 29, 1957 |